United States Patent
Hisamura et al.

(10) Patent No.: US 10,525,799 B2
(45) Date of Patent: Jan. 7, 2020

(54) UTILITY VEHICLE

(71) Applicant: KAWASAKI JUKOGYO KABUSHIKI KAISHA, Hyogo (JP)

(72) Inventors: Takashi Hisamura, Hyogo (JP); Masato Kinoshita, Hyogo (JP); Dexter Spitsnogle, Lincoln, NE (US)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 114 days.

(21) Appl. No.: 15/966,521

(22) Filed: Apr. 30, 2018

(65) Prior Publication Data

US 2019/0329633 A1 Oct. 31, 2019

(51) Int. Cl.
| | |
|---|---|
| *B62D 25/04* | (2006.01) |
| *B60J 5/04* | (2006.01) |
| *B60R 11/02* | (2006.01) |
| *B60R 11/00* | (2006.01) |

(52) U.S. Cl.
CPC ........... *B60J 5/0413* (2013.01); *B60J 5/0415* (2013.01); *B60R 11/0217* (2013.01); *B60R 2011/0021* (2013.01); *B60R 2011/0043* (2013.01)

(58) Field of Classification Search
CPC .... E04H 1/1205; E04B 1/34321; B60P 3/423; B62D 47/003; B60N 2/01; B60J 10/16; B60J 10/24; B60J 5/0451; B60J 10/265; A47B 2031/006
USPC ...................................................... 296/146.5
See application file for complete search history.

(56) References Cited

U.S. PATENT DOCUMENTS

| | | | | |
|---|---|---|---|---|
| 2,682,427 | A * | 6/1954 | Bright | B60J 5/0487 135/117 |
| 5,094,313 | A * | 3/1992 | Mauws | B62D 21/08 180/210 |
| 7,216,926 | B2 * | 5/2007 | Hampel | B62D 29/043 296/102 |
| 7,281,753 | B2 * | 10/2007 | Curtis, Jr. | B60J 5/0487 296/146.1 |
| 9,387,746 | B2 * | 7/2016 | Rutland | B60J 11/06 |
| 2005/0110298 | A1 * | 5/2005 | Fin | B60J 5/0487 296/146.5 |
| 2009/0184541 | A1 * | 7/2009 | Yamamura | B60N 2/005 296/190.08 |
| 2014/0065936 | A1 * | 3/2014 | Smith | B60K 26/02 454/69 |
| 2015/0014974 | A1 * | 1/2015 | Cotnoir | B60J 5/0487 280/756 |
| 2015/0047917 | A1 * | 2/2015 | Burt, II | B62D 25/2036 180/292 |
| 2015/0274212 | A1 * | 10/2015 | Karube | B62D 25/12 296/193.11 |
| 2016/0185192 | A1 * | 6/2016 | Yamamoto | B60J 5/0476 296/146.9 |
| 2016/0332536 | A1 * | 11/2016 | Weber | B60P 1/04 |
| 2018/0312025 | A1 * | 11/2018 | Danielson | B60T 7/06 |
| 2018/0326843 | A1 * | 11/2018 | Danielson | F16H 57/035 |

* cited by examiner

*Primary Examiner* — Kiran B Patel

(74) *Attorney, Agent, or Firm* — Wenderoth, Lind & Ponack, L.L.P.

(57) ABSTRACT

A utility vehicle includes a door. The door includes an inner door panel disposed close to a cabin, and an outer door panel attached to an outer end of the inner door panel. The outer door panel is attached to an outer end of an upper portion of the inner door panel to expose a lower portion of the inner door panel when viewed from outside the vehicle.

6 Claims, 9 Drawing Sheets

UTILITY VEHICLE

BACKGROUND OF THE INVENTION

1. Technical Field

The present invention relates to a utility vehicle.

2. Description of Related Art

Some of utility vehicles include a door as standard equipment or optional equipment, as disclosed in US 2016/0185192 and the like.

A utility vehicle preferably includes a light door in consideration of user requirement such as mobility for the utility vehicle.

SUMMARY

In view of the above, it is an object of the present invention to achieve reduction in weight of a door of a utility vehicle.

In order to achieve this object, according to an aspect of the present invention, there is provided a utility vehicle including a door, in which the door includes an inner door panel disposed close to a cabin, and an outer door panel attached to an outer end of the inner door panel, and the outer door panel is attached to an outer end of an upper portion of the inner door panel to expose a lower portion of the inner door panel when viewed from outside the vehicle.

The configuration according to such an aspect achieves reduction in weight of the door of the utility vehicle.

DETAILED DESCRIPTION

According to an aspect of the present invention, a utility vehicle includes a door, in which the door includes an inner door panel disposed close to a cabin, and an outer door panel attached to an outer end of the inner door panel, and the outer door panel is attached to an outer end of an upper portion of the inner door panel to expose a lower portion of the inner door panel when viewed from outside the vehicle.

For example, the door includes a door frame, and the door frame is accommodated in a space between the inner door panel and the outer door panel.

For example, the door frame extends slantedly upward toward a rear side of the vehicle such that a vehicle rear end of the door frame is positioned laterally to a shoulder of a crew on a seat.

For example, part of the door frame passes through a slit or a through hole provided at the inner door panel to be positioned closer to the cabin than the lower portion of the inner door panel.

For example, the inner door panel and the outer door panel are different in color.

For example, the door frame includes a speaker bracket configured to mount a speaker.

An embodiment will now be described in more detail with reference to FIGS. 1 to 9. FIGS. 1 to 9 depict a utility vehicle according to the embodiment.

Unnecessarily detailed description may not be made where appropriate. For example, an already well known matter may not be described in detail or substantially identical configurations may not be descried repeatedly. It is to prevent the following description from becoming unnecessarily long as well as to allow those skilled in the art to easily understand the description.

The inventors provide the accompanying drawings and the following description in order to allow those skilled in the art to fully understand the present disclosure, without any intention to limit a subject matter recited in the patent claims.

Directions "front", "rear", "left", and "right" mentioned in the present application are viewed from a driver boarding and driving the utility vehicle.

Figure 1:
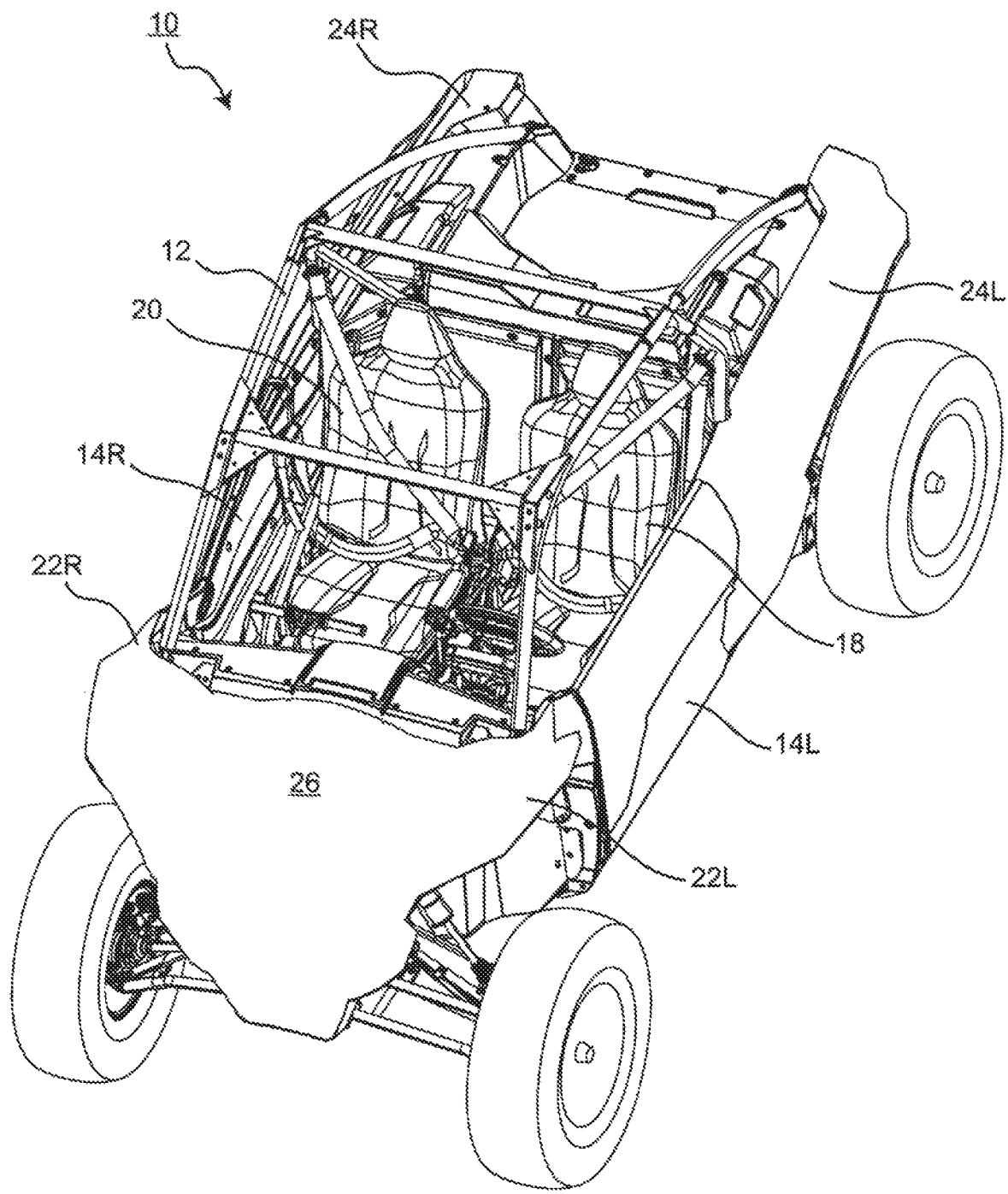
FIG. 1 is a perspective view of a utility vehicle according to an aspect of the present invention.
Figure 2:
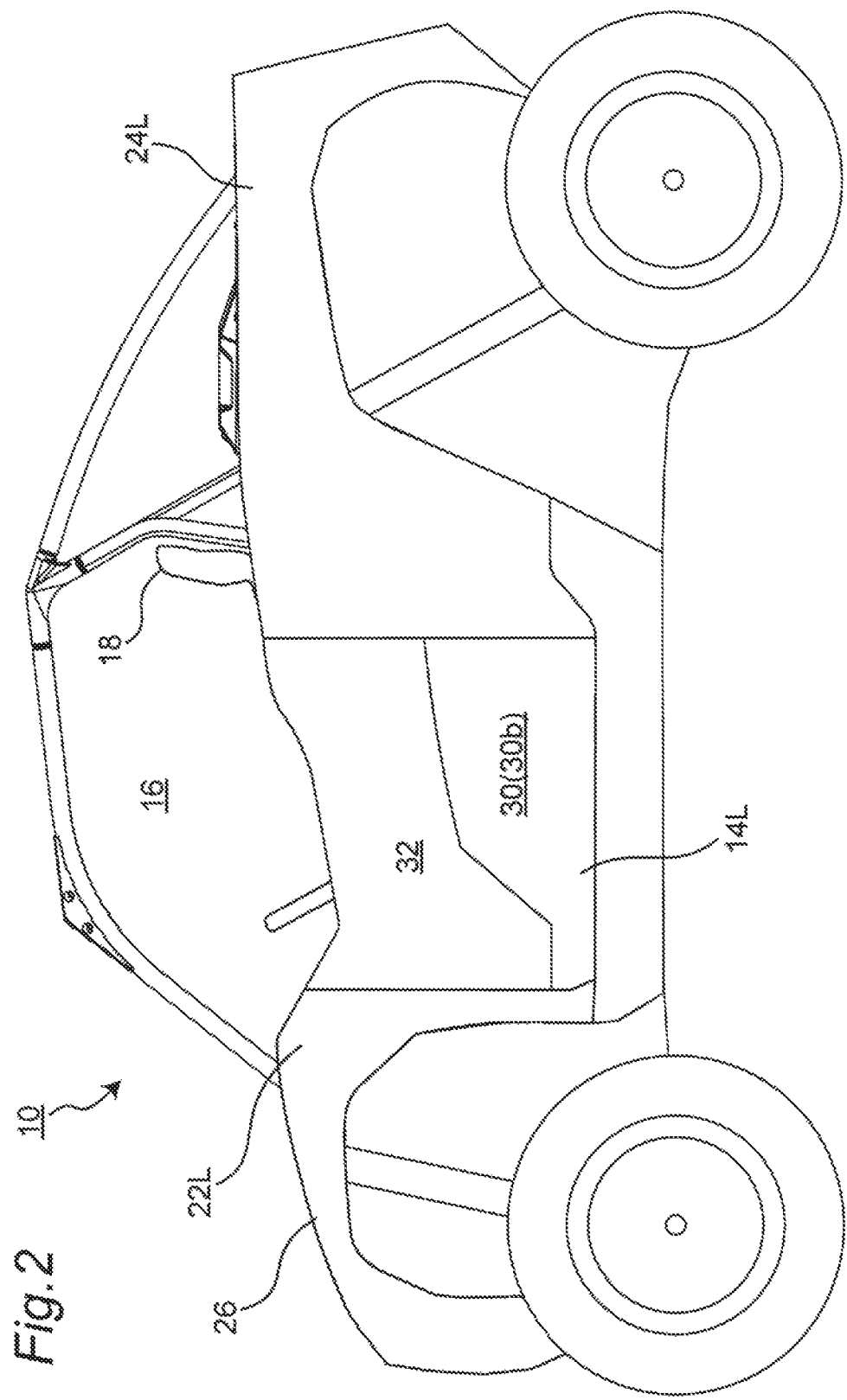
FIG. 2 is a side view of the utility vehicle.

As depicted in FIGS. 1 and 2, a utility vehicle 10 according to the embodiment includes a rollover protective structure (ROPS) 12 protecting crews, and doors 14L and 14R attached to the ROPS 12.

The ROPS 12 and the doors 14L and 14R define a cabin 16 accommodating the crews. The cabin 16 is provided therein with a driver's seat 18 and a passenger seat 20 aligned in the vehicle width direction.

The door 14L is attached to a left end of the utility vehicle 10, and is disposed on the left of the driver's seat 18. The door 14R is attached to a right end of the utility vehicle 10, and is disposed on the right of the passenger seat 20.

The doors 14L and 14R will be described in detail next. The doors 14L and 14R are configured identically except for being symmetric with respect to the transverse direction. The door 14L will thus mainly be described while the door 14R will not be described herein.

The door 14L configures a part of a body of the utility vehicle 10. The body of the utility vehicle 10 includes left and right front fenders 22L and 22R, left and rear fenders 24L and 24R, the left and right doors 14L and 14R, and a hood 26. The door 14L, the left front fender 22L, and the left rear fender 24L configure a left surface of the body.

Figure 3:
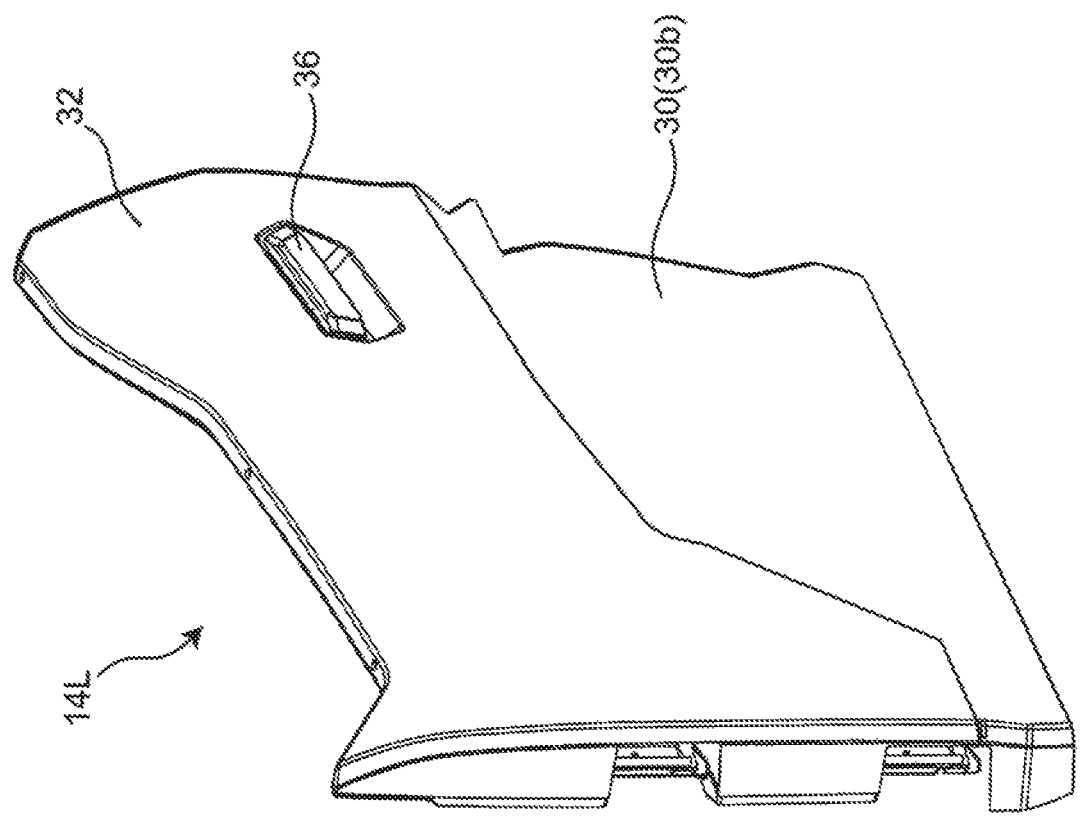
FIG. 3 is a perspective view from outside the vehicle, of a door.
Figure 4:
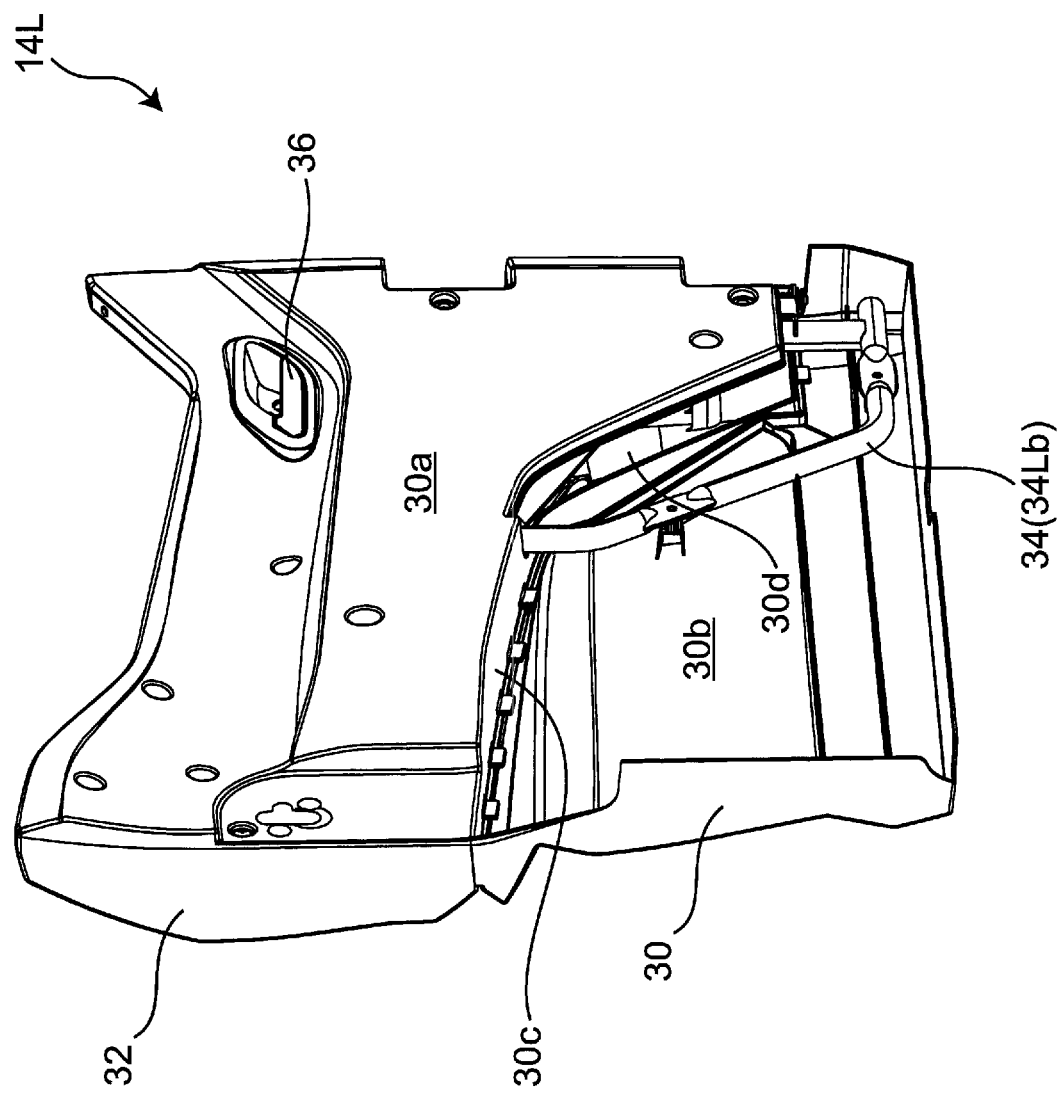
FIG. 4 is a perspective view from a cabin, of the door.
Figure 5:
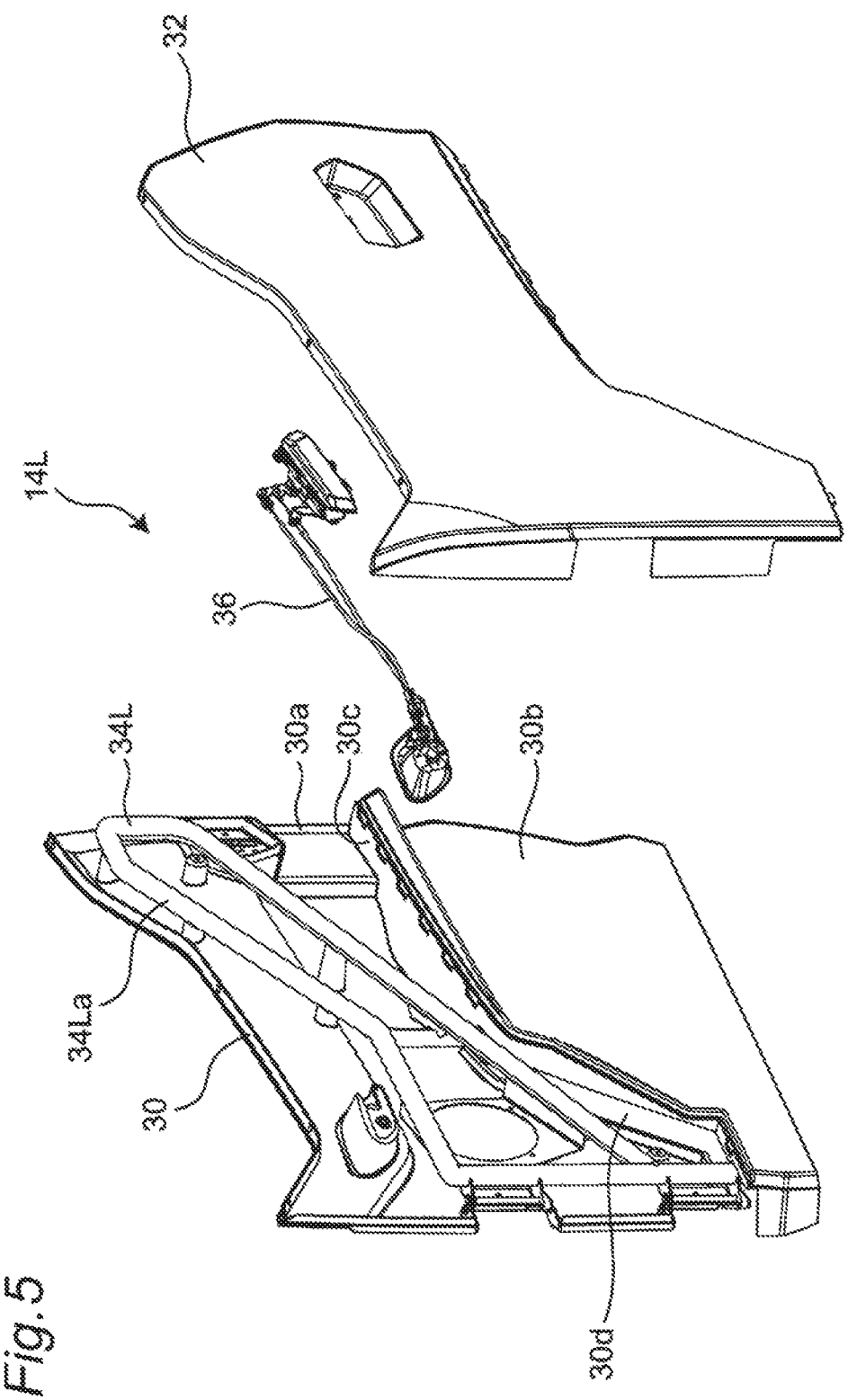
FIG. 5 is an exploded view of the door with an outer door panel detached therefrom.

As depicted in FIGS. 3 to 5, the door 14L includes an inner door panel 30 disposed closer to the cabin 16, and an outer door panel 32. In the embodiment, the door 14L further includes a door frame 34, and a door lock device 36 configured to lock the door 14L.

In the embodiment, the inner door panel 30 and the outer door panel 32 of the door 14L are made of a light material such as a resin material. The inner door panel 30 and the outer door panel 32 can be made of an identical material or can be made of materials different from each other. In the embodiment, the inner door panel 30 and the outer door panel 32 are different in color for a high design property of the utility vehicle 10.

The inner door panel 30 of the door 14L is disposed close to the cabin 16, and the outer door panel 32 is attached to an outer end of the inner door panel 30.

Specifically, the outer door panel 32 is smaller in size than the inner door panel 30 as depicted in FIG. 5, and is attached to an outer end of an upper portion 30a of the inner door panel 30. When viewed from outside the cabin 16 of the utility vehicle 10, a lower portion 30b of the inner door panel 30 is not covered with the outer door panel 32 but is exposed as depicted in FIG. 2. That is, the door 14L has an outer surface (design surface) including an upper portion configured by the outer door panel 32 and a lower portion configured by the inner door panel 30. As depicted in FIG. 4, the door 14L has an inner surface (cabin surface) configured by entirety (including the upper portion 30a and the lower portion 30b) of the inner door panel 30.

The inner door panel 30 and the outer door panel 32 thus configured achieve the light-weighed door 14L. Specifically, in comparison to a case, unlike as in the embodiment, where the entire outer surface of the door is configured only by the outer door panel and the entire inner surface of the door is configured only by the inner door panel, in other words, where the door includes the inner door panel and the outer door panel sized substantially equally and attached to each other, the door is light weighed in the embodiment.

Furthermore, in the embodiment, the inner door panel 30 and the outer door panel 32 are different in color, such that the door 14L viewed from outside the cabin 16 of the utility vehicle 10 has an upper portion and a lower portion different in color. This configuration achieves dual-color decoration of the outer surface of the door without painting. The door 14L thus obtains the high design property.

The utility vehicle 10 is likely to be scratched due to its application. In the case where the outer surface of the door is decorated by dual-color painting, the paint may be removed to deteriorate the design property. In the embodiment, the outer surface of the door 14L is, however, configured by the inner door panel 30 and the outer door panel 32 different in color, and is thus less likely to cause deterioration in design property due to any scratch or the like on the outer surface of the door 14L.

Figure 7:
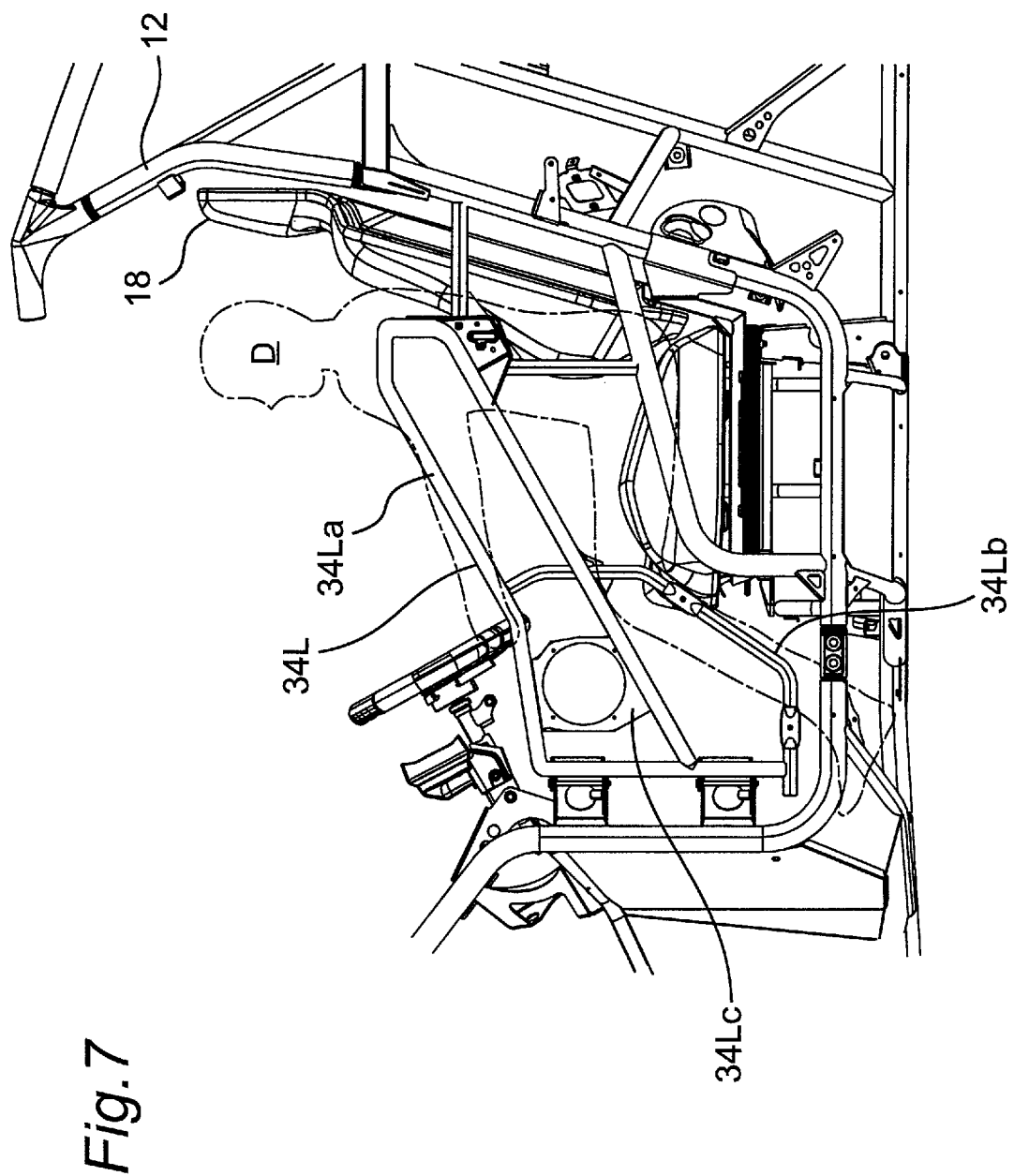
FIG. 7 is a partial exploded side view of the utility vehicle including the door frame.

As depicted in FIG. 7, the door 14L includes a door frame 34L having a main frame 34La extending from the front side toward the rear side of the utility vehicle 10, and a sub frame 34Lb reinforcing rigidity of the main frame 34La. The door frame 34L improves rigidity of the door 14L.

Figure 8:
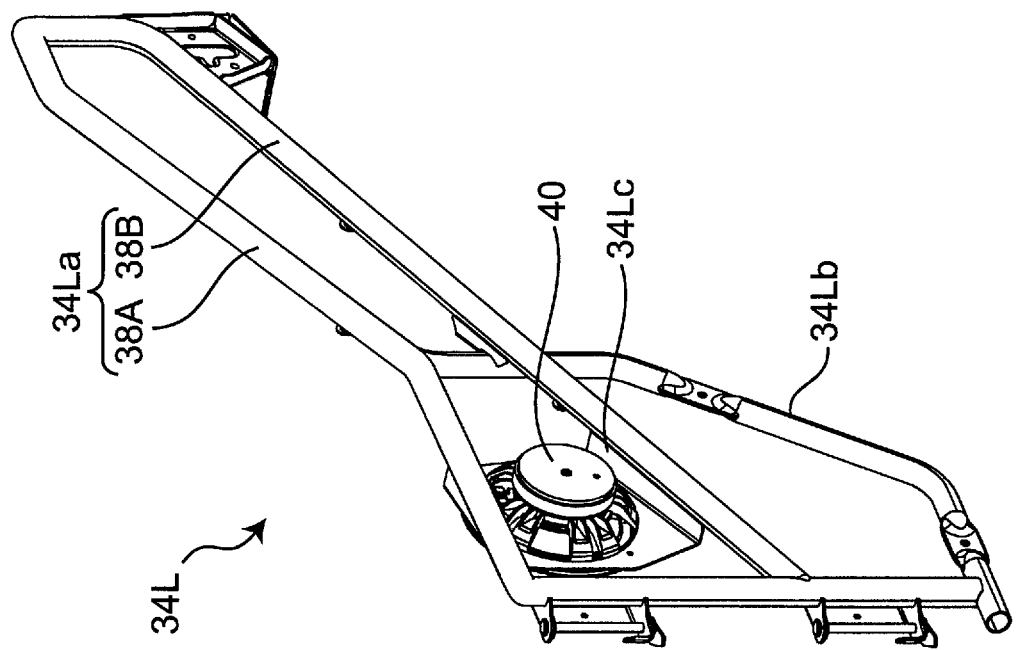
FIG. 8 is a perspective view of the door frame with a speaker mounted thereto.

In the embodiment, the main frame 34La of the door frame 34L is configured by pipe members and extends from the front side toward the rear side of the utility vehicle 10. Specifically, the main frame 34La includes an upper frame 38A and a lower frame 38B disposed below the upper frame 38B. A rear end of the upper frame 38A and a rear end of the lower frame 38B are coupled to each other. The sub frame 34Lb is configured by a pipe member and coupled to the upper and lower frames 38A and 38B of the main frame 34La. As depicted in FIG. 8, the main frame 34La is provided with a speaker bracket 34Lc configured to mount an optional speaker 40.

Figure 6:
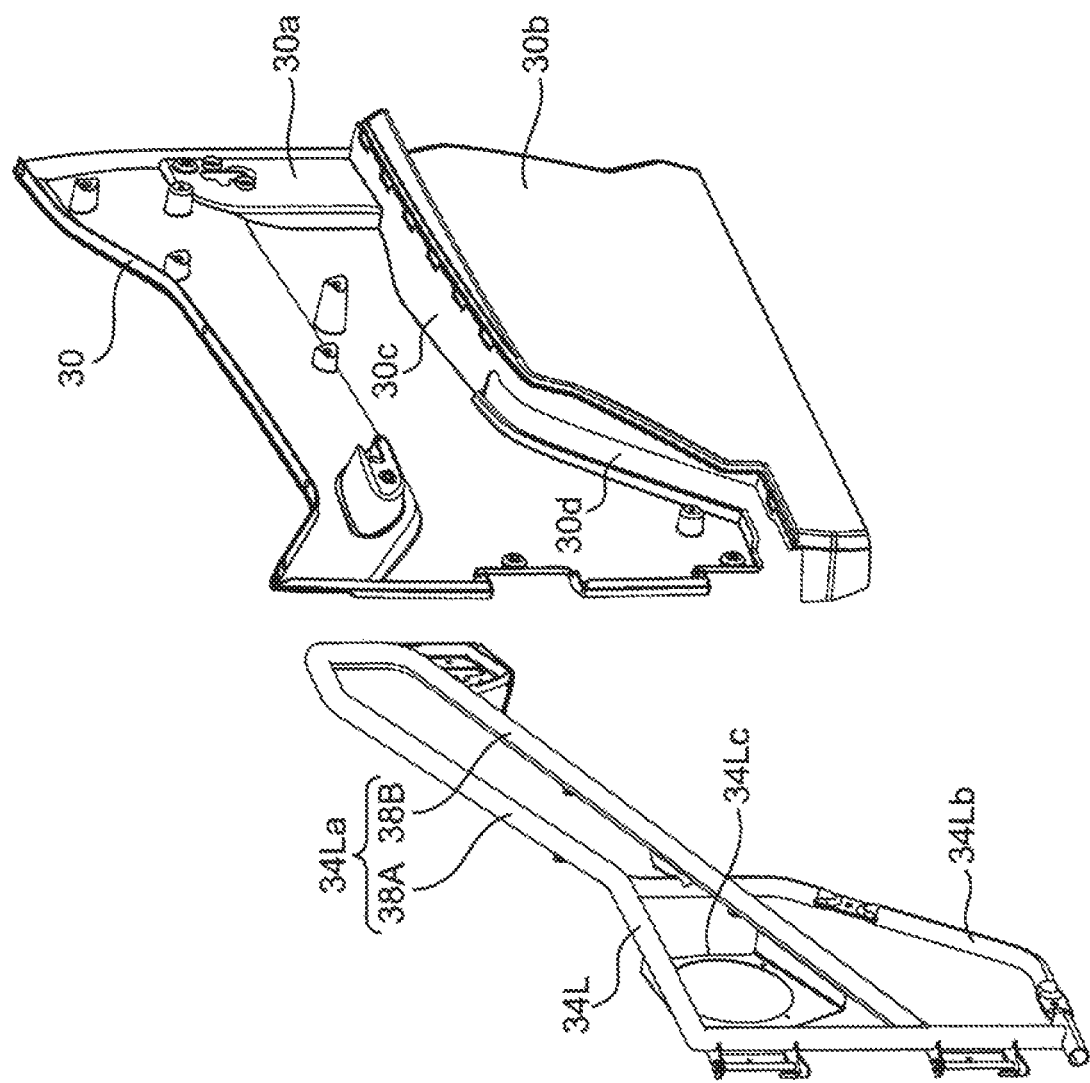
FIG. 6 is a perspective view of an inner door panel detached from a door frame.
Figure 9:
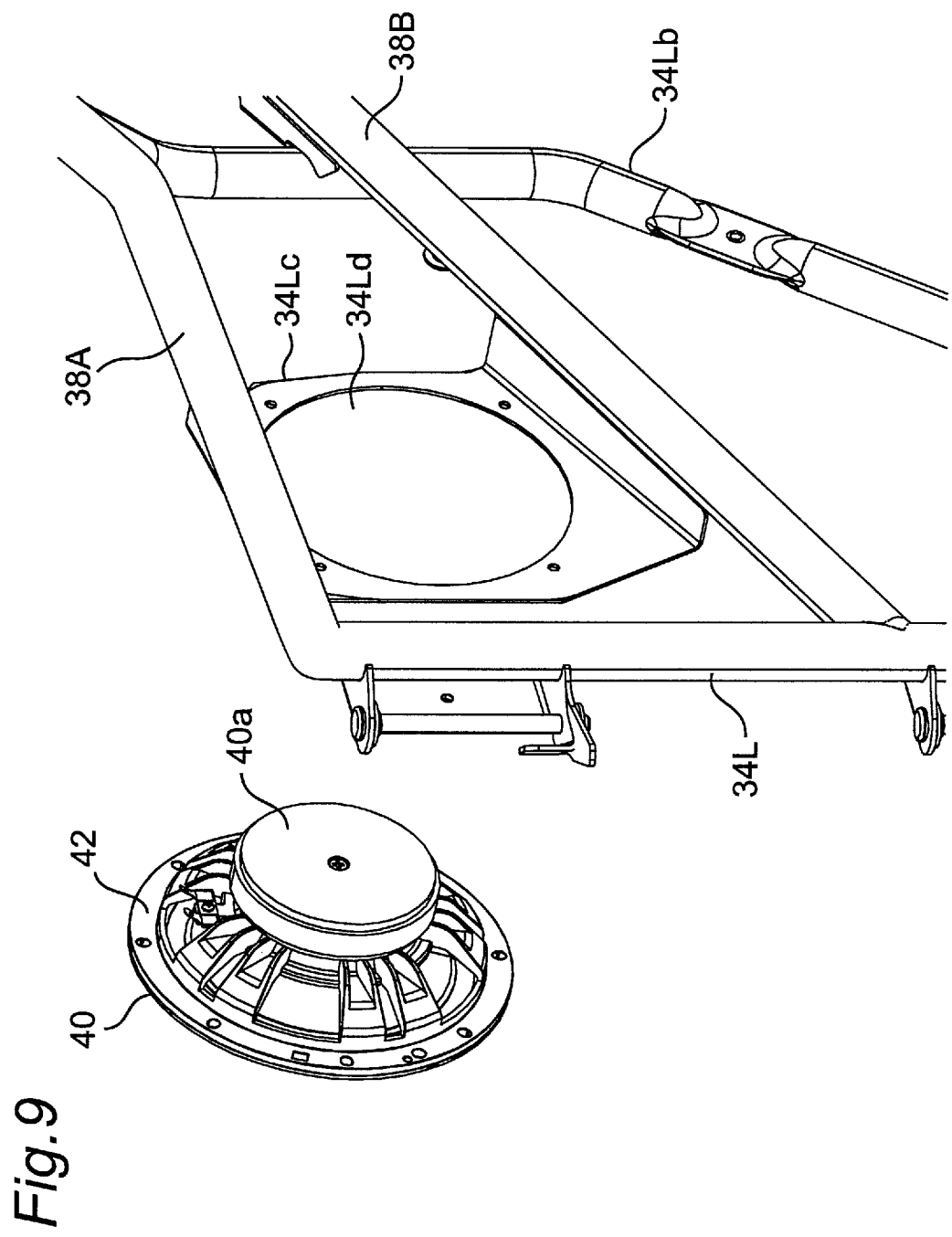
FIG. 9 is a perspective view of the speaker detached from the door frame.

In the embodiment, the speaker bracket 34Lc, as depicted in FIGS. 6 and 7, is a plate-like member with an upper end welded to the upper frame 38A and a lower end welded to the lower frame 38B. As depicted in FIG. 9, the speaker bracket 34Lc has a through-hole 34Ld through which a magnetic circuit part 40a of the speaker 40 passes. With the magnetic circuit part 40a passes through the through-hole 34Ld, a flame 42 of the speaker 40 is attached to the speaker bracket 34Lc by, for example, screws (not shown). The speaker 40 is thus fixed to the door 14L. The speaker 40 is fixed to a highly rigid portion (the door frame having higher rigidity than the door panel) of the door 14L, and the speaker 40 outputting audio sound is thus restrained from vibrating the door 14L. In addition to the holding the speaker 40, the speaker bracket 34Lc functions as a reinforced member to improve rigidity of the main frame 34La.

As depicted in FIG. 7, the main frame 34La (the upper frame 38A and the lower frame 38B thereof) of the door frame 34L extends from the front side toward the rear side of the utility vehicle 10 as well as is slanted upward. The rear end of the main frame 34La is thus positioned laterally to a shoulder of a user D at the driver's seat 18. The door frame 34L thus complies with ANSI/ROHVA 1-2016.

As depicted in FIG. 5, the main frame 34La of the door frame 34L is fixed by means of a bolt (not shown) or the like to the outer surface of the upper portion 30a of the inner door panel 30. The main frame 34La fixed to the upper portion 30a of the inner door panel 30 is covered with the outer door panel 32 attached to the upper portion 30a of the inner door panel 30. Specifically, the main frame 34La of the door frame 34L is accommodated in a space between the upper portion 30a of the inner door panel 30 and the outer door panel 32. The main frame 34La of the door frame 34L is thus inhibited from deteriorating the design property of the door 14L.

As depicted in FIG. 5, the main frame 34La of the door frame 34L is positioned outside the upper portion 30a of the inner door panel 30. Meanwhile, (most of) the sub frame 34Lb positioned below the main frame 34La is positioned inside (close to the cabin) the lower portion 30b of the inner door panel 30 as depicted in FIG. 4. The door frame 34L thus crosses the inner door panel 30 when viewed in the anteroposterior direction of the utility vehicle 10.

Specifically, the upper portion 30a of the inner door panel 30 is offset toward the cabin with respect to the lower portion 30b, as depicted in FIG. 6. There is thus provided, between the upper portion 30a and the lower portion 30b, an intermediate portion 30c coupling the upper portion 30a and the lower portion 30b and extending in the vehicle width direction of the utility vehicle 10. The intermediate portion 30c has a slit 30d allowing the sub frame 34Lb of the door frame 34L to pass therethrough. These configurations allow part of the door frame 34L to be positioned outside the inner door panel 30 and allow the remaining part of the door frame 34L to be positioned inside the inner door panel 30. The slit 30d of the intermediate portion 30c can be replaced with a through hole allowing the part of the door frame 34L to pass therethrough.

As depicted in FIG. 4, most of the sub frame 34Lb of the door frame 34L is positioned inside (close to the cabin) the lower portion 30b of the inner door panel 30, to inhibit the door frame from deteriorating the design property of the outer surface of the door 14L.

The embodiment described above exemplifies the technique of the present invention. The accompanying drawings and the detailed description are provided for the exemplification. Those constituent elements depicted in the accompanying drawings and disclosed in the detailed description will include constituent elements essential for achievement of the object as well as constituent elements not essential for achievement of the object but for exemplification of the technique. Accordingly, those inessential constituent elements should not be regarded as being essential simply because the inessential constituent elements are depicted in the accompanying drawings or are disclosed in the detailed description.

The above embodiment is provided for exemplification of the technique according to the present invention, and will thus accept modification, replacement, addition, removal, and the like in various manners within the scope of the patent claims or an equivalent scope.

The invention claimed is:

1. A utility vehicle comprising a door, wherein the door includes
an inner door panel disposed close to a cabin, and
an outer door panel attached to an outer end of the inner door panel, and
the outer door panel is attached to an outer end of an upper portion of the inner door panel to expose a lower portion of the inner door panel when viewed from outside the vehicle.

2. The utility vehicle according to claim 1, wherein the door includes a door frame, and
the door frame is accommodated in a space between the inner door panel and the outer door panel.

3. The utility vehicle according to claim 2, wherein the door frame extends slantedly upward toward a rear side of the vehicle such that a vehicle rear end of the door frame is positioned laterally to a shoulder of a crew on a seat.

4. The utility vehicle according to claim 1 wherein a part of the door frame passes through a slit or a through hole provided at the inner door panel to be positioned closer to the cabin than the lower portion of the inner door panel.

5. The utility vehicle according to claim 1 wherein the inner door panel and the outer door panel are different in color.

6. The utility vehicle according to claim 2, wherein the door frame includes a speaker bracket configured to mount a speaker.

* * * * *